United States Patent

Fischer et al.

(10) Patent No.: US 8,535,190 B2
(45) Date of Patent: Sep. 17, 2013

(54) TRANSMISSION DEVICE WITH POWER SPLITTING

(75) Inventors: Roland Fischer, Oberteuringen (DE); Michael Siber, Nusplingen (DE); Robert Morrison, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 51 days.

(21) Appl. No.: 13/496,037

(22) PCT Filed: Feb. 9, 2010

(86) PCT No.: PCT/EP2010/051550
§ 371 (c)(1),
(2), (4) Date: Mar. 14, 2012

(87) PCT Pub. No.: WO2011/038941
PCT Pub. Date: Apr. 7, 2011

(65) Prior Publication Data
US 2012/0178565 A1    Jul. 12, 2012

(30) Foreign Application Priority Data
Sep. 29, 2009  (DE) .................. 10 2009 045 087

(51) Int. Cl.
*F16H 47/04*    (2006.01)
(52) U.S. Cl.
USPC ............................................. 475/80
(58) Field of Classification Search
USPC ................ 475/1, 6, 72, 74, 80, 218, 329
See application file for complete search history.

(56) References Cited

U.S. PATENT DOCUMENTS

| | | | |
|---|---|---|---|
| 4,121,479 A | 10/1978 | Schauer | |
| 6,039,666 A * | 3/2000 | Okuda et al. | 475/72 |
| 7,395,728 B2 | 7/2008 | Regenscheit | |
| 7,530,914 B2 | 5/2009 | Fabry et al. | |
| 8,262,530 B2 * | 9/2012 | Bailly et al. | 475/217 |
| 8,460,147 B2 * | 6/2013 | Legner | 475/207 |
| 2002/0035833 A1 * | 3/2002 | Otten | 60/454 |
| 2003/0131686 A1 | 7/2003 | Huber | |
| 2008/0085801 A1 * | 4/2008 | Sedoni et al. | 475/72 |
| 2009/0270212 A1 * | 10/2009 | Ueda et al. | 475/74 |
| 2010/0197438 A1 | 8/2010 | Legner | |
| 2010/0204001 A1 | 8/2010 | Legner | |
| 2010/0210389 A1 | 8/2010 | Legner et al. | |

FOREIGN PATENT DOCUMENTS

| | | |
|---|---|---|
| DE | 11 2006 001 445 T5 | 5/2008 |
| DE | 10 2007 047 194 A1 | 4/2009 |
| DE | 10 2008 001 613 A1 | 11/2009 |
| EP | 1 329 648 A2 | 7/2003 |
| WO | 2009/047037 A1 | 4/2009 |
| WO | 2009/047038 A1 | 4/2009 |

* cited by examiner

*Primary Examiner* — Justin Holmes
*Assistant Examiner* — Huan Le
(74) *Attorney, Agent, or Firm* — Davis & Bujold, PLLC (57) ABSTRACT

A transmission with power branching, and the transmission, in a first drive range, transmits torque from the ring gear to a fixed wheel. In one branch, power is transmitted from a first to a second hydraulic unit which respectively operate as a pump and a motor. At one of the hydrostatic shafts, the mechanical and hydrostatic power are summed and transmitted to the drive output. In a second drive range, power coming from the planetary carrier is partially branched off to the ring gear and transmitted, via the gear wheels of the hydrostatic shaft, to the second hydraulic unit. From the second hydraulic unit, hydraulic power passes to the first hydraulic unit. In the process, the first hydraulic unit operates as a motor and the second hydraulic unit as a pump. From the second sun gear, power is transmitted to the double planetary gear and summed.

11 Claims, 6 Drawing Sheets

TRANSMISSION DEVICE WITH POWER SPLITTING

This application is a National Stage completion of PCT/EP2010/051550 filed Feb. 9, 2010, which claims priority from German patent application serial no. 10 2009 045 087.4 filed Sep. 29, 2009.

FIELD OF THE INVENTION

The invention concerns a transmission device with power branching.

BACKGROUND OF THE INVENTION

A power branching transmission, in particular for a working machine such as a wheel loader, is known from DE 10 2007 047 194 A1 and is formed with a hydrostatic and a mechanical power branch. The power branches are added by a summation gear system, a reversing transmission being connected upstream from the summation gear system and a gearshift transmission being connected downstream therefrom.

By virtue of the power branching transmission, in each case two driving ranges for forward driving and for reversing can be obtained, within which a transmission ratio of the power branching transmission can be varied continuously by means of a hydrostatic device. The driving ranges can be changed by disengaging an engaged shifting element and engaging a disengaged shifting element.

Disadvantageously, a shifting element provided for obtaining a second driving range of the power branching transmission is arranged on a hydrostatic shaft of the hydrostatic device, and because of this to connect the hydrostatic shaft to a mechanical power branch involves complex design. Among other things this results from the fact that to dampen vibrations, the hydrostatic device is usually mounted by way of an elastic rubber mount, and therefore, in the connection area between the hydrostatic device and the mechanical power branch, an axial offset that varies during operation has to be compensated by a connection device of appropriately articulated design. Without additional design measures, however, the result of this constant compensation, in turn, is that in the area of the shifting element arranged on the hydrostatic shaft vibrations are induced to an undesired extent and the tendency to wobble increases.

Moreover, due to the arrangement of the shifting element on the hydrostatic shaft the power branching transmission takes up considerable fitting space since the two hydrostatic shafts of the hydrostatic device have to be arranged a certain distance apart from one another in order to be able to provide the space necessary for fitting the shifting element on the hydrostatic shaft.

SUMMARY OF THE INVENTION

Thus, the purpose of the present invention is to make available a transmission device with power branching, which occupies less structural fitting space and is of simple design.

In the transmission device with power branching, part of an applied torque can be transmitted in a first power branch at least by way of a hydrostatic device with at least two hydrostatic shafts, and the other part of the torque in a second power branch preferably by way of a mechanical device with a plurality of countershafts between a transmission input and a transmission output. In each case at least two driving ranges for forward and reverse driving are provided, which can be shifted between in each case by means of at least one shifting element to be disengaged and at least one shifting element to be engaged.

According to the invention, each of the shifting elements is arranged on a separate countershaft device.

Since the shifting elements are all, respectively, arranged on a separate shaft and in particular not on a hydrostatic shaft of the hydrostatic device, with little design effort the hydrostatic shaft can be brought into functional connection with a transmission output of the transmission device.

Furthermore the transmission device according to the invention also occupies less space, since compared with the power branching transmission known from the prior art the hydrostatic shafts of the hydrostatic device can be arranged a smaller distance apart from one another.

In a simply designed manner the design of the transmission device according to the invention offers the possibility of making the transmission device with more than two driving ranges for forward and reverse driving.

For the power branching and summation of the portions of the applied torque that can be transmitted by way of the power branches, in a further advantageous embodiment of the transmission device according to the invention, a transmission device in the form of a planetary gear system is provided, which comprises two sun gears that mesh with common double planetary gears which, in turn, mesh with a ring gear. A planetary gear system which takes up little space in the radial direction can be arranged in a simple manner next to further, coaxially arranged gearwheels which engage with other gearwheels mounted on parallel countershafts. The small radial space requirement enables the various gearwheel pairs to be arranged in an axially space-saving manner, so that overall, the transmission device takes up little space in the axial direction.

In another advantageous embodiment of the transmission device according to the invention, a shifting element half that is connected to the associated countershaft, preferably the inner disk carrier of the first shifting element and by which the first driving range can be obtained in the engaged condition of the shifting element, is functionally connected with the drive output shaft by way of a gearwheel of the countershaft. Thereby, in a simply designed manner there is less of a tendency for wobbling in the area of the first shifting element at high driving speeds, and drag torques resulting therefrom in the area of the first shifting element, which adversely affect the efficiency of the transmission device, are reduced as well as avoiding thermal damage of the clutch.

An inner disk carrier or an outer disk carrier of the first shifting element can be connected to the countershaft and the outer disk carrier or the inner disk carrier can be connected to a gearwheel that can be coupled, via the first shifting element, to the associated countershaft.

In a further design development of the transmission device according to the invention, the gearwheel that can be connected in a rotationally fixed manner by the first shifting element to the associated countershaft meshes with a fixed wheel of the shaft associated with the hydrostatic device and the fixed wheel of the countershaft is functionally connected with the transmission output shaft.

In a further, simply designed embodiment of the transmission device according to the invention, the gearwheel that can be connected in a rotationally fixed manner, via the first shifting element, to the associated countershaft is functionally connected to the transmission output shaft and the fixed wheel of the countershaft meshes with a fixed wheel of the shaft associated with the hydrostatic device.

In a further advantageous embodiment of the transmission device according to the invention, a loose wheel which can be connected in a rotationally fixed manner to the associated countershaft by means of a second shifting element, by which the second driving range can be obtained when the second shifting element is in the engaged operating condition, meshes with a fixed wheel that is connected in a rotationally fixed manner to the second sun gear of the transmission device, and a fixed wheel of the countershaft is in functional connection with the gearwheel of the countershaft associated with the first shifting element, whereby the second driving range can be obtained with a small number of toothed engagements in the area of the mechanical device.

In an advantageous further development of the transmission device according to the invention, a further shifting element arranged on an additional countershaft of the preferably mechanical second power branch is provided to obtain a third driving range and which can be integrated without elaborate design measures into the existing concept of the transmission device according to the invention, whereby the transmission device according to the invention is characterized by a high modularity and can be adapted in a simple manner for various applications.

In a further advantageous embodiment of the transmission device according to the invention, a loose wheel, which can be connected in a rotationally fixed manner to the associated countershaft by the third shifting element, by means of which the third driving range can be obtained when the third shifting element is in the engaged operating condition, meshes with another fixed wheel of the shaft associated with the hydrostatic device, and a fixed wheel of the countershaft is functionally connected to the drive output shaft, whereby the third driving range can also be obtained with the smallest possible number of toothed engagements in the area of the mechanical device.

In first and third driving ranges of the transmission device, the power of the two power branches can be summed by means of a shaft connected to the hydrostatic device.

A fixed wheel of a transmission input can be connected, via a fixed wheel of a further countershaft, to a hydraulic pump of a first working hydraulic system and, via a fixed wheel of an additional countershaft, to a hydraulic pump of a second working hydraulic system, so that depending on the transmission ratios between the fixed wheel of the transmission input shaft and the fixed wheels of the further countershafts, the hydraulic pumps can be driven, respectively, at the same rotational speed or at different rotational speeds.

A configuration of the transmission device according to the invention that is of simple design and can be actuated with little effort, is characterized in that the transmission input can be brought into functional connection with the planetary carrier of the planetary gear system by means of drive direction shifting elements.

To adapt the transmission device according to the invention with little design complexity to the structural space existing in the vehicle, either the fixed wheels are arranged between the drive direction shifting elements and a transmission input, or the drive direction shifting elements are arranged between the fixed wheels and the transmission input.

In a further advantageous embodiment, by means of the drive direction shifting elements that are arranged between the transmission input and the transmission device or the planetary gear system, a shift can be carried out between a forward driving mode and a reversing mode. Thus, a vehicle constructed with the transmission device according to the invention can be operated both in the forward and the reverse drive direction with little design complexity and small control and regulation effort.

An embodiment of the transmission device that can be operated with little control and regulation effort is formed in the area of the hydrostatic device of the first power branch with at least a first hydraulic unit that can be operated as a pump and a motor, and with at least a second hydraulic unit functionally connected thereto by a hydraulic circuit, which can also be operated as a motor and a pump, both of these being adjustable and preferably being in the form of inclined-axis units.

In order to continuously vary the transmission ratio of the transmission device according to the invention both within a driving range and over all the driving ranges, in an advantageous embodiment of the transmission device an absorption volume and a delivery volume of the hydraulic units can be varied within a range of 0% to 100%, so that the torque produced is transmitted, at maximum absorption volume of one hydraulic unit and minimum delivery volume of the other hydraulic unit, completely by way of the first power branch comprising the hydrostatic device, and at minimum absorption volume of one hydraulic unit and maximum delivery volume of the other hydraulic unit, completely by way of the second power branch that comprises the mechanical unit.

In a simply designed further development of the transmission device according to the invention, the first hydraulic unit of the hydrostatic device is connected to one of the sun gears of the transmission device.

In a further, simply designed embodiment of the transmission device according to the invention, at least part of the applied torque can be transmitted by way of one of the sun gears of the transmission device or the ring gear to the second power branch, which comprises the preferably mechanical device.

In one design, if changes in the driving range in the transmission device according to the invention can be carried out synchronously, the respective shifting elements provided for shifting between the driving ranges can be dimensioned as frictional shifting elements with small dimensions, since during the shifting processes between the driving ranges only little frictional work has to be performed in the area of the shifting elements, so that also only little friction power is involved in the area of the shifting elements.

Both the characteristics specified in the claims and those indicated in the following example embodiments of the transmission device according to the invention are in each case suitable, whether considered in isolation or in any desired combination with one another, to further develop the object of the invention. In relation to the further development of the object of the invention, the respective combinations of characteristics do not represent any limitation, but are presented essentially only as examples.

BRIEF DESCRIPTION OF THE DRAWINGS

Further advantages and advantageous embodiments of the transmission device according to the invention emerge from the claims and from the example embodiments whose principle is described below with reference to the drawing wherein, for the sake of clarity, the same indexes are used in the description of the various example embodiments for components having the same structure and function.

The drawing shows.

DETAILED DESCRIPTION OF THE PREFERRED EMBODIMENTS

Figure 1:
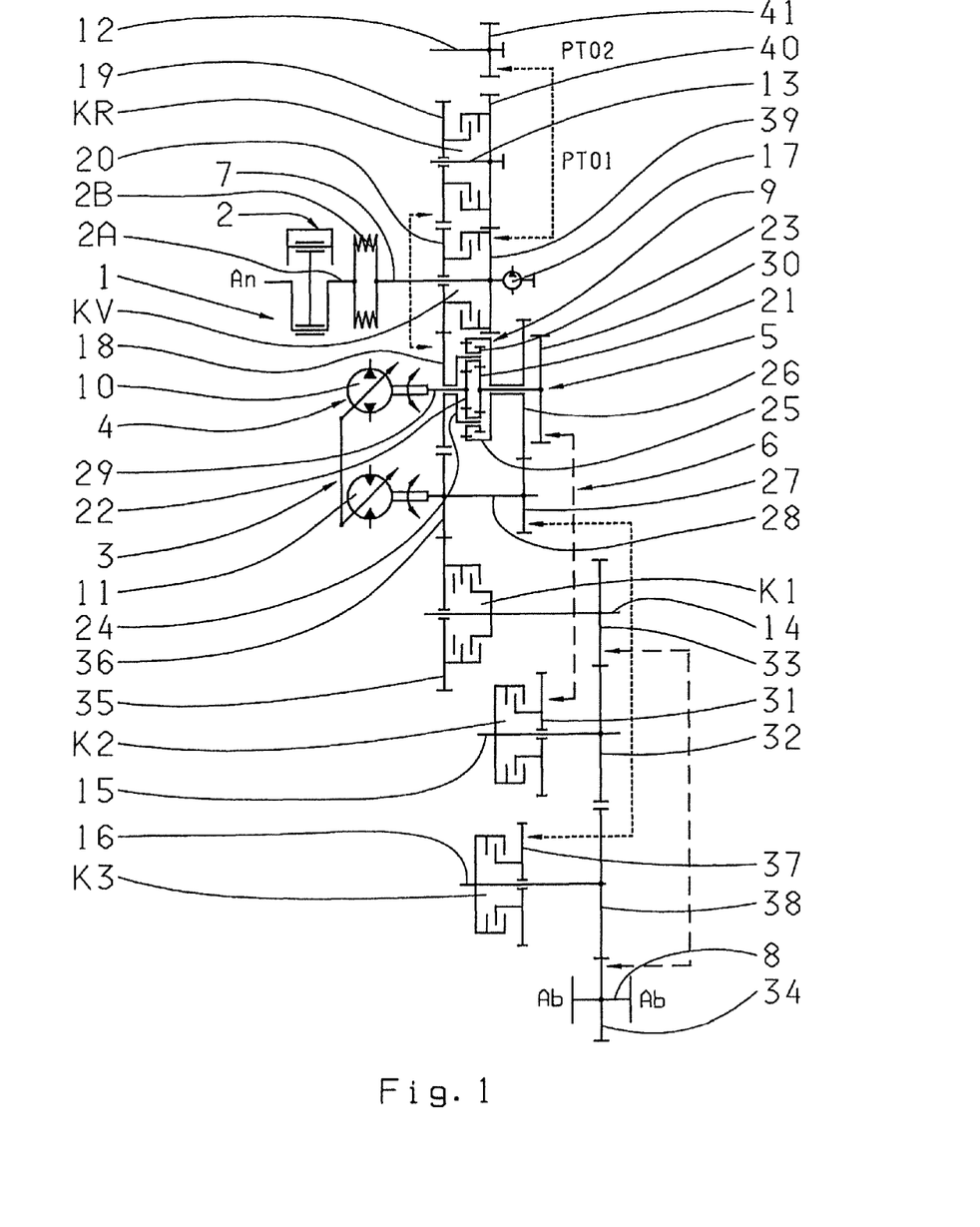
FIG. 1: A transmission layout of a first embodiment of a transmission device with power branching, in which range changes can be carried out synchronously.

FIG. 1 shows a gear layout of a first embodiment of a transmission device 1 with power branching and with synchronous range changes. In a first power branch 3 part of a torque applied by a drive machine 2 can be transmitted by way of a hydrostatic device 4 and in a second power branch 5 the remainder of the torque can be transmitted by way of a mechanical device 6, between a transmission input or a transmission input shaft 7 and a transmission output or transmission output shaft 8. The two power branches 3 and 5 are functionally connected by a transmission device 9, in this case in the form of a planetary gear system.

Between a motor output shaft 2A and the transmission input shaft 7 is arranged a so-termed oscillation damper 2B, by means of which rotation irregularities in the area of the drive machine 2 are damped and only transmitted to a small extent into the transmission device 1 and the remainder of the drive-train of a vehicle or construction machine vehicle.

The transmission device 1 is designed with three driving ranges for forward and reverse driving, which can be respectively switched between by disengaging a shifting element K1, K2 or K3 and engaging at least one shifting element K1, K2 or K3.

The hydrostatic device 4 of the first power branch 3 comprises a first hydraulic unit 10 and a second hydraulic unit 11 connected thereto by a hydraulic circuit (not shown in the drawing), which are adjusted by a common yoke and are designed as inclined-axis units. The two hydraulic units 10 and 11 can each be operated as a pump and as a motor, the mode of operation changing depending on the driving range engaged in the transmission device 1 in the manner described later.

In addition the transmission device 1 is configured as a countershaft transmission with a plurality of countershafts 12 to 16 at a distance apart from one another, whereby the transmission device 1 takes up little fitting space in the axial direction and more space in the radial direction or vertically in its fitted position, this being provided in order to bridge an axis distance between the motor output shaft 2A of the drive machine 2 and the transmission output shaft 8 and the drive axles of the vehicle in this case made as a wheel loader.

Between the transmission input 7 and the planetary gear system 9 are provided two drive direction shifting elements KR and KV, by means of which a shift between a forward driving mode and a reverse driving mode can be carried out. In the area of the countershaft 13 associated with the drive direction shifting element KR for reverse drive, a hydraulic pump of a first working hydraulic system, and in the area of the countershaft 12, a hydraulic pump of a second working hydraulic system can be coupled and can be driven by the drive machine 2. For this, a fixed wheel 39 of the transmission input shaft 7 engages with a fixed wheel 40 of the further countershaft 13 and a fixed wheel 41 of the additional countershaft 12. In the area of the transmission input shaft 7 is arranged a transmission pump 17, which is driven directly by the drive machine 2.

By means of the a transmission pump 17, besides the hydraulic circuit that connects the two hydrostatic units 10 and 11 of the hydrostatic device 4 to one another, which is made as a closed circuit, a lubrication and cooling circuit of the transmission device 1 can be supplied with hydraulic fluid. In addition the shifting elements K1 to K3 and the drive direction shifting elements KR and KV can be acted upon by a hydraulic working pressure by means of the transmission pump 17, and can thereby be changed from an essentially disengaged operating condition to an essentially fully engaged operating condition.

Both the shifting elements K1 to K3 and the drive direction shifting elements KR and KV are in the form of frictional shifting elements, so that during the synchronous range changes, despite any rotational speed differences that may exist in the area of the shifting elements K1 to K3 and the drive direction shifting elements KR and KV, these can be equalized.

In the present case, the planetary gear system 9 comprises two sun gears 21, 22 which mesh with common double planetary gearwheels 23, which for their part are mounted to rotate on a planetary carrier 24. By way of the drive direction shifting elements KV and KR and by way of a gearwheel 18, which meshes both with a gearwheel 19 that can be connected in a rotationally fixed manner to the countershaft 13 by the drive direction shifting element KR or a further gearwheel 20 that can be connected in a rotationally fixed manner to the transmission input shaft 7 by the drive direction shifting element KV, the transmission input shaft 7 can be brought into functional connection with the planetary carrier 24. In addition the double planetary gearwheels 23 mesh with a ring gear 25, which engages by way of a fixed wheel 26 with a further fixed wheel 27 of a hydrostatic shaft 28 of the hydrostatic device 4 which is functionally connected to the second hydraulic unit 11.

In this case the first hydrostatic unit 10 is connected in a rotationally fixed manner to the second sun gear 22 of the planetary gear system 9 by means of an additional hydrostatic shaft 29.

Depending on the absorption volume of the first hydraulic unit 10 or the second hydraulic unit 11 and on a delivery volume of the second hydraulic unit 11 or the first hydraulic unit 10, in the second driving range in each case at least part of the torque applied by the drive machine 2 can be transmitted into the second power branch 5 containing the mechanical device 6, by way of the planetary carrier 24 of the planetary gear system 9 and the double planetary gearwheels 23 and the ring gear 25, or the first sun gear 21 of the planetary gear system 9 and a fixed wheel 30 that is connected in a rotationally fixed manner thereto.

Basically, in the example embodiment of the transmission device 1 shown in FIG. 1 the drive power of the drive machine 2 is transmitted to the planetary carrier 24 of the planetary gear system 9 by way of the drive direction shifting element KR or KV. Starting from the planetary carrier 24, a part of the drive torque of the drive machine 2 that depends on the operating condition of the hydrostatic device 4, when the first shifting element K1 by means of which the first driving range can be engaged in the transmission device 1 is closed, is transmitted by way of the double planetary gearwheels 23 and the sun gear 22 into the first hydraulic unit 10, which is operated as a pump when the first driving range is engaged. The mechanical drive then takes place by way of the ring gear 25 and the fixed wheel 26 connected in a rotationally fixed manner thereto, which meshes with the fixed wheel 27 of the first hydrostatic shaft 28.

By means of the first shifting element K1 a loose wheel 35 can be connected in a rotationally fixed manner to the countershaft 14, whereby the drive torque of the drive machine 2 can be transmitted by a further fixed wheel 36 of the hydrostatic shaft 28 which meshes with the loose wheel 35, to a fixed wheel 33 of the countershaft 14 and the fixed wheel 34 of the transmission output shaft 8 which meshes therewith.

If the second hydraulic unit 11 then operating as a motor is static and the first hydrostatic unit 10 is operating at its maximum rotational speed, the absorption volume of the second hydrostatic unit 11 is a maximum, while the delivery volume of the first hydrostatic unit is equal to zero. The drive power of the drive machine 2 is then transmitted completely hydrostatically by the transmission device 1, this corresponding to the first limit of the first driving range.

The second limit of the first driving range that can be set by means of the shifting element K1 is then obtained when the first hydraulic unit 10 operated as a pump is static and the speed of the second hydraulic unit 11, operated as a motor, is at its maximum, so that the absorption volume of the second hydraulic unit 11 is equal to zero and the delivery volume of the first hydraulic unit 10 is at its maximum value. In this operating condition of the hydrostats 4, the drive power of the drive machine 2 is transmitted by the transmission device 1 completely mechanically between the transmission input shaft 7 and the transmission output shaft 8.

If it is correspondingly required to engage the second driving range in the transmission device 1, the two hydraulic units 10 and 11 are swiveled until the second shifting element K2 is essentially in the synchronous operating condition. Then the shifting element K2 is engaged and at the same time the first shifting element K1 is disengaged. When the second driving range is engaged, the first hydraulic unit 10 is operated as a motor and the second hydraulic 11 as a pump, whereby the drive torque of the drive machine 2 is transmitted at least in part into the second hydraulic unit 11 by way of the planetary carrier 24, the double planetary gearwheels 23, the ring gear 25, the fixed wheel 26, the further fixed wheel 27 and the hydrostatic shaft 28.

Depending on the swiveled position of the two hydrostatic units 10 and 11, a fraction of the drive torque of the drive machine 2 corresponding thereto is passed on to the first hydraulic unit 10 and by way of the hydrostatic shaft 29 and the second sun gear 22 to the double planetary gearwheels 23. The second sun gear 21, which also meshes with the double planetary gearwheels 23, meshes via the fixed wheel 30 with a loose wheel 31 which, when the second shifting element K2 is in its engaged operating condition, is connected in a rotationally fixed manner to the countershaft 15, whereby the drive torque of the drive machine 2 is passed on by way of a fixed wheel 32 of the countershaft 15 to the fixed wheel 33 of the countershaft 14 that meshes with it. In turn, the fixed wheel 33 of the countershaft 14 meshes with a fixed wheel 34 of the transmission output shaft 8, by which the drive output of the vehicle built with the transmission device 1 is driven.

If in turn it is required to change the driving range starting from the second driving range to the third driving range, the hydrostatic device 4 is correspondingly adjusted so as to bring the third shifting element K3 to a synchronous operating condition while the second shifting element K2 is still engaged. When the third shifting element K3 is at least approximately in its synchronous operating condition, it is engaged and the second shifting element K2 is changed to its disengaged operating condition, whereby due to the engagement of the third shifting element K3 a loose wheel 37 is connected in a rotationally fixed manner to the countershaft 16, the loose wheel meshing with the fixed wheel 27 of the hydrostatic shaft 28. In this way a fixed wheel 38 of the countershaft 16 that meshes with the fixed wheel 34 of the transmission output shaft 8 is coupled with the second hydraulic unit 11, which when the third driving range is engaged is again operated as a motor while, as when the first driving range is engaged, the first hydraulic unit 10 changes to pump operation.

In the first driving range that can be engaged by means of the first shifting element K1, the highest transmission ratio can be obtained in the transmission device 1, whereas in the second driving range that can be engaged by means of the second shifting element K2, a medium transmission ratio, and in the third driving range that can be engaged by means of the third shifting element K3, the lowest transmission ratio range can be obtained in the transmission device 1. The three driving ranges are designed in such manner that the first driving or transmission ratio range and the second transmission ratio range, and also the second transmission ratio range and the third transmission ratio range overlap, and the transmission ratios of the transmission device 1 can be varied continuously and, for the driver of a vehicle built with this transmission device, in a manner imperceptible and free from traction force interruptions, over the entire transmission ratio range of the transmission device 1 extending from the lower transmission ratio limit in the first driving range up to the upper transmission ratio limit in the third driving range.

The transmission device 1, which can be used in the building machinery sector, constitutes a continuously adjustable transmission by means of which high traction forces and driving speeds preferably up to 40 km/h can be achieved. All of the shifting elements K1 to K3 are arranged on separate countershafts 14, 15 and 16, so that when the transmission device 1 is used in the building machinery sector with lower traction force requirements the transmission device can, in a simple manner, be produced as a two-range transmission which is then formed without the countershaft 16, the third shifting element K3, the loose wheel 37 and the fixed wheel 38. Thus the transmission device 1 provides a high degree of modularity and, without having to modify the transmission housing and the connections of the transmission output shaft 8, can be produced both as a three-range transmission and as a two-range transmission while taking up the same amount of structural fitting space.

Moreover, the various drive ranges in the transmission device 1 can be obtained with few tooth engagements, that is to say, in this case in the forward drive direction respectively four tooth engagements and in the reverse drive direction five tooth engagements, without the tooth engagements present in the area of the planetary gear system 9.

Since the three range transitions between the driving ranges can in each case be carried out in the synchronous operating condition of the shifting elements K1 to K3, i.e. both in an upshift and also in a downshift between the three driving ranges, in a simple manner it is made possible to design and dimension the shifting elements K1 to K3 with lower power, since in each case only little frictional work has to be performed by the shifting elements K1 to K3 and in all cases, compared with non-synchronous range changes, much lower friction power has to be taken up by the shifting elements K1 to K3.

Due to the arrangement of the third shifting element K3 on the separate countershaft 16 and not, as in transmissions known from the prior art, on the hydrostatic shaft 28 of the hydrostatic device 4, in the engaged third driving range the rotational speeds of the power-transmitting components are lower, so the loading of those components is reduced.

In addition, over the entire operating range of the transmission device 1 it is ensured that the drive torque of the drive machine 2 is transmitted from the transmission input shaft 7 to the transmission output shaft 8 and during this none of the loose wheels are exposed to dynamic loading.

Furthermore, in the present case an inner disk carrier of the first shifting element K1 is coupled with the drive output or transmission output shaft 8 so that, particularly at high driving speeds of a vehicle built with the transmission device 1, there is less tendency for wobbling to occur in the area of the first shifting element K1.

When the first driving range is engaged in the transmission device 1, the mechanical power branch 5 transmits torque from the ring gear 25, via the fixed wheel 26, to the further fixed wheel 27. During this, a branching from the ring gear 25 takes place. The hydrostatic power branch 3 branches off from the second sun gear 22. For this, the hydrostatic power branch transmits power from the first hydraulic unit 10 to the second hydraulic unit 11. During this the first hydraulic unit 10 operates as a pump and the second hydraulic unit as a motor. At the first hydrostatic shaft 28, the mechanical power and the hydrostatic power are summed and transmitted by the fixed wheel 36 to the drive output. In the second driving range, the power coming from the planetary carrier 24 partly branches off to the ring gear 25 and is transmitted by way of the gearwheels 26 and 27 on the first hydrostatic shaft 28 to the second hydraulic unit 11. From the second hydraulic unit 11, the hydraulic power is transmitted to the first hydraulic unit 10. During this the first hydraulic unit 10 operates as a motor and the second hydraulic unit as a pump. From the second sun gear 22 the power then passes to the double planetary gear 23, where it is summed. The summed power is transmitted from the first sun gear 21 and then from the gearwheel 30 to the drive output. In the third driving range, the power is transmitted as in the first driving range, the summed power being transmitted to the drive output by the gearwheel 27.

In FIGS. 2 to 6 respective gearing layouts of five further embodiments of the transmission device 1 are shown, each of which differs only in some areas from the first example embodiment shown in FIG. 1, so that in the descriptions of FIGS. 2 to 6 given below only the differences from the first embodiment will be discussed, whereas in relation to the basic functional mode of the transmission device 1 reference should be made to the earlier description concerning FIG. 1.

Figure 2:
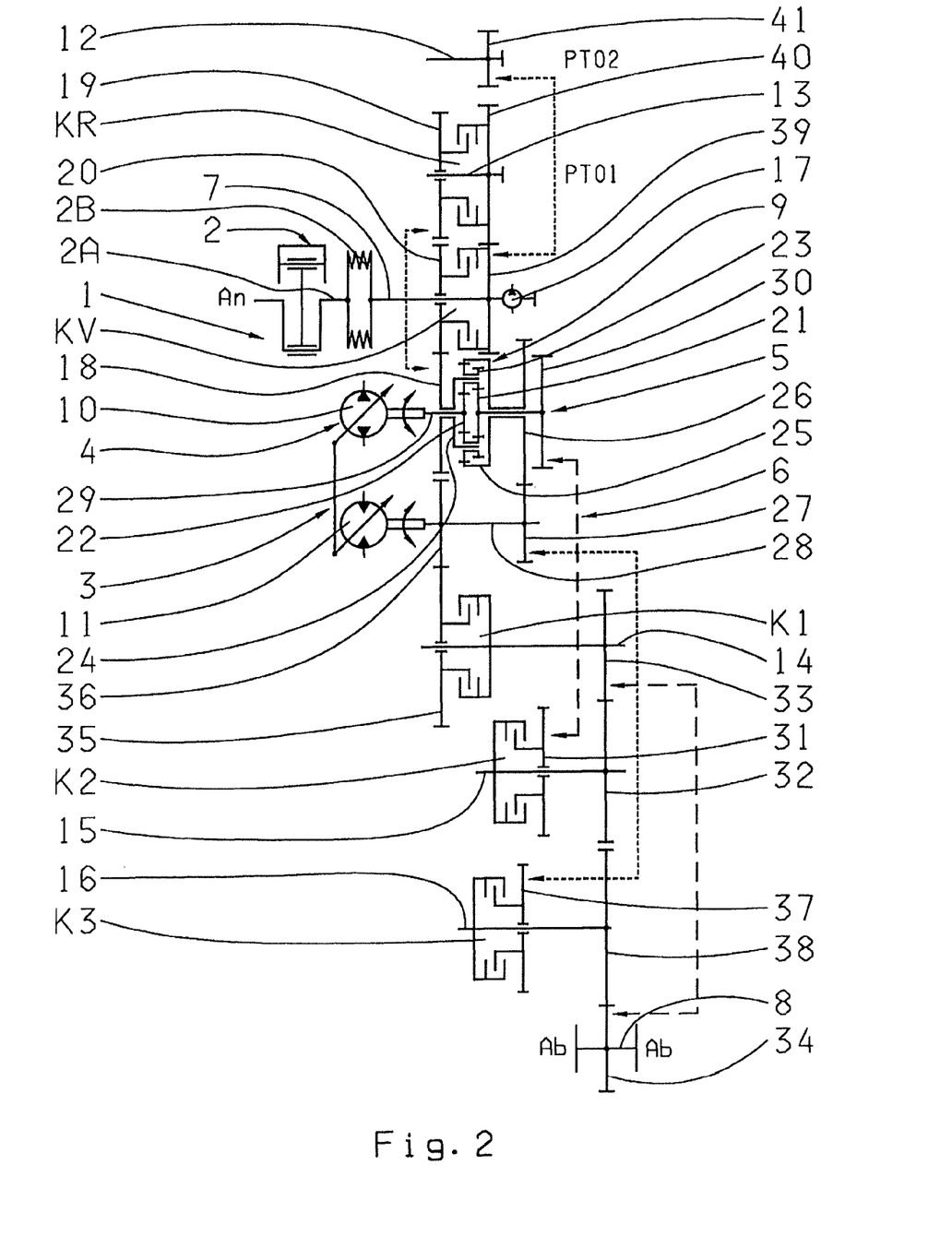
FIG. 2: A representation corresponding to FIG. 1, showing a second embodiment of the transmission device according to the invention.

In the second example embodiment of the transmission device 1 shown in FIG. 2, the outer disk carrier of the first shifting element K1 is connected in a rotationally fixed manner to the countershaft 14, while the inner disk carrier is coupled in a rotationally fixed manner with the gearwheel 35 which is made as a loose wheel. As a result, when the third driving range is engaged, the high reverse rotational speeds are transferred starting from the fixed wheel 34, by way of the gearwheel 33, to the outer disk carrier of the first shifting element K1.

Figure 3:
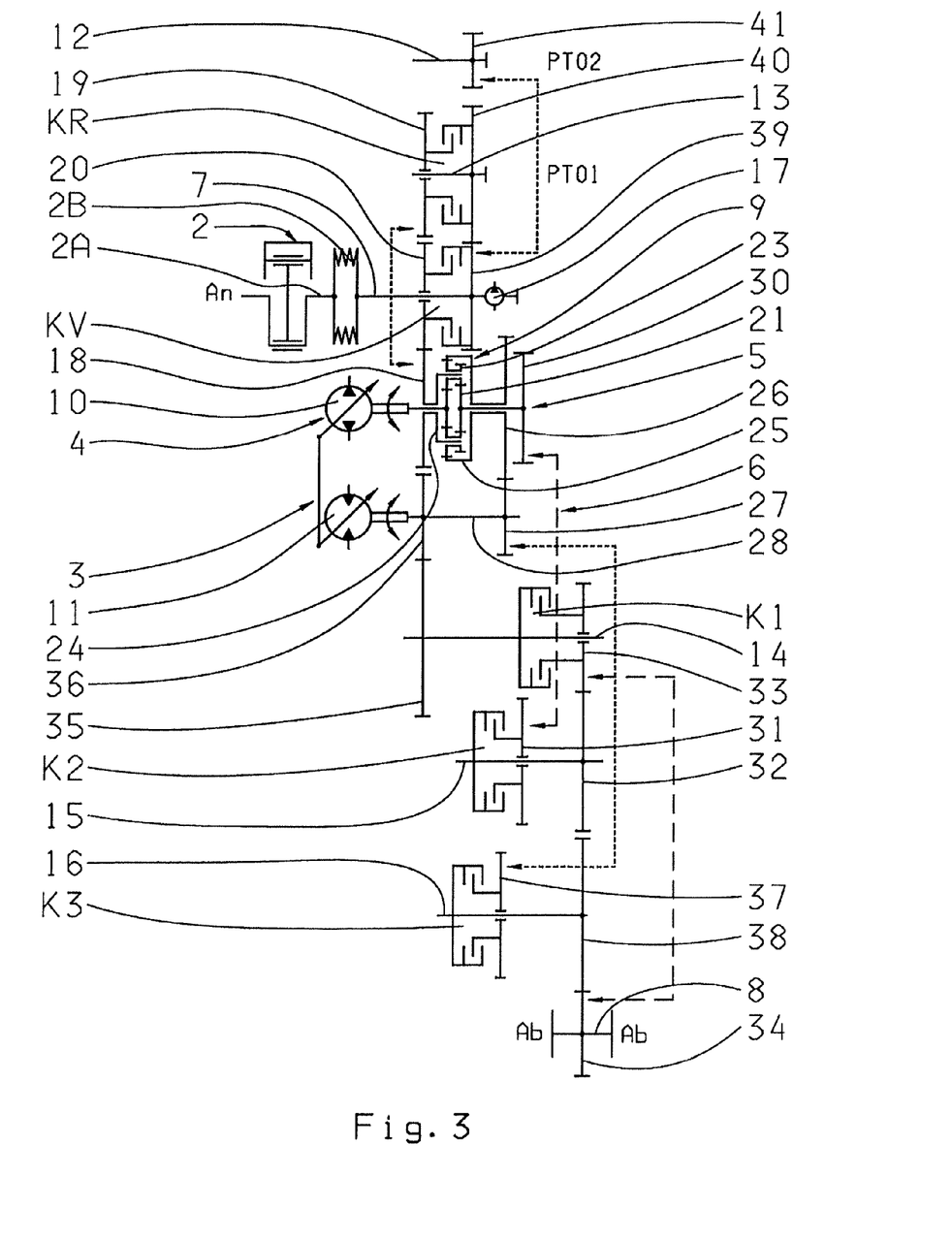
FIG. 3: A representation corresponding to FIG. 1, showing a third embodiment of the transmission device according to the invention.

In the third example embodiment of the transmission device 1 shown in FIG. 3, the gearwheel 35 of the countershaft 14, associated with the first shifting element K1, is made as a fixed wheel, while the gearwheel 33 is mounted as a loose wheel to rotate on the countershaft 14 and can be connected in a rotationally fixed manner by means of the first shifting element K1 to the countershaft 14 in order to obtain the first driving range. The outer disk carrier of the first shifting element K1 is connected in a rotationally fixed manner to the countershaft, while the inner disk carrier is connected permanently to the gearwheel 33.

In this design version of the transmission device 1, during the engagement of the second driving range the gearwheel 33 is dynamically loaded.

In the second embodiment shown in FIG. 2, in the second driving range and in the area of the mechanical device 6 the power is transmitted from the loose wheel 31, via the fixed wheel 32 to the fixed wheel 33 and thence to the fixed wheel 34 of the transmission output shaft 8, and in the third embodiment shown in FIG. 3, in the second driving range and in the area of the mechanical device the power is transmitted from the loose wheel 31, via the fixed wheel 32, to the loose wheel 33 and to the fixed wheel 34 of the transmission output shaft 8, although if the transmission device 1 is designed as a two-range transmission, the countershaft 16 associated with the third shifting element K3 is not needed and can therefore be omitted.

Figure 4:
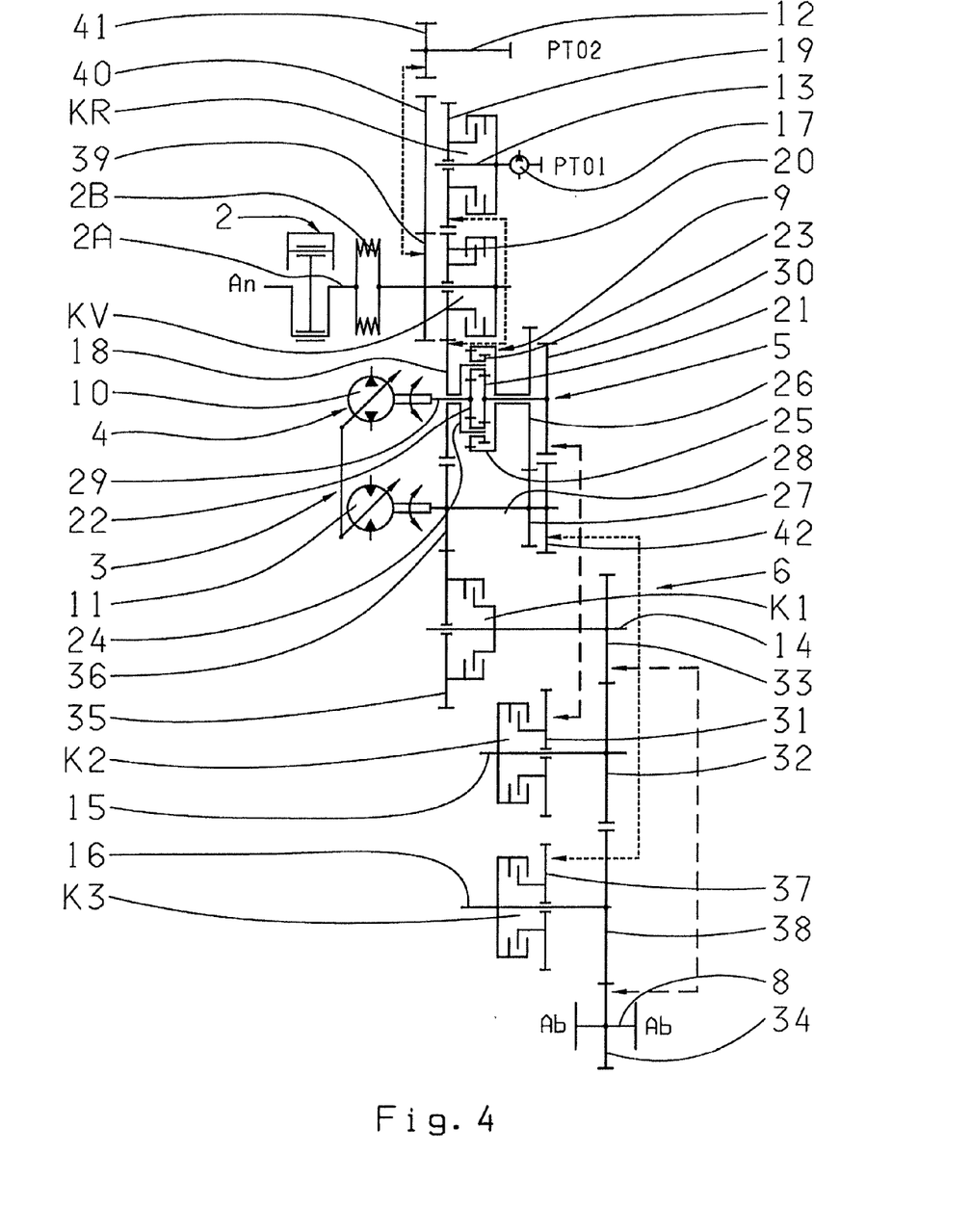
FIG. 4: A representation corresponding to FIG. 1, showing a fourth embodiment of the transmission device according to the invention.

Compared with the first embodiment of the transmission device 1 shown in FIG. 1, the transmission device 1 show in FIG. 4 is made in the area of the hydrostatic shaft 28 with a further fixed wheel 42 which, instead of the further fixed wheel 27, meshes with the loose wheel 37 of the countershaft 16 associated with the third shifting element K3.

In a simple manner this makes it possible to arrange the third shifting element K3 with the associated countershaft 16 a greater distance away from the first hydrostatic shaft 28 and enables the first hydrostatic shaft 28 to make the first hydrostatic shaft 28 with a shaft diameter adapted to the loads that occur, without having to enlarge the distance between axis of the hydrostatic shafts 28 and 29 to an extent that would increase the hydraulic losses in the hydraulic circuit between the two hydraulic units 10 and 11.

In this case, in a simply designed way the further fixed wheel 42 is mounted by a press fit on the first hydrostatic shaft 28 and, in a design of the transmission device 1 as a two-range transmission, it is not fitted at all on the first hydrostatic shaft 28.

Furthermore, in contrast to the embodiment of the transmission device 1 according to FIG. 1, the fixed wheels 39, 40 and 41 are arranged between the transmission input 7 and the drive direction shifting elements KR and KV, whereby in a simple manner the transmission device 1 can be adapted to the structural space available in a vehicle.

Figure 5:
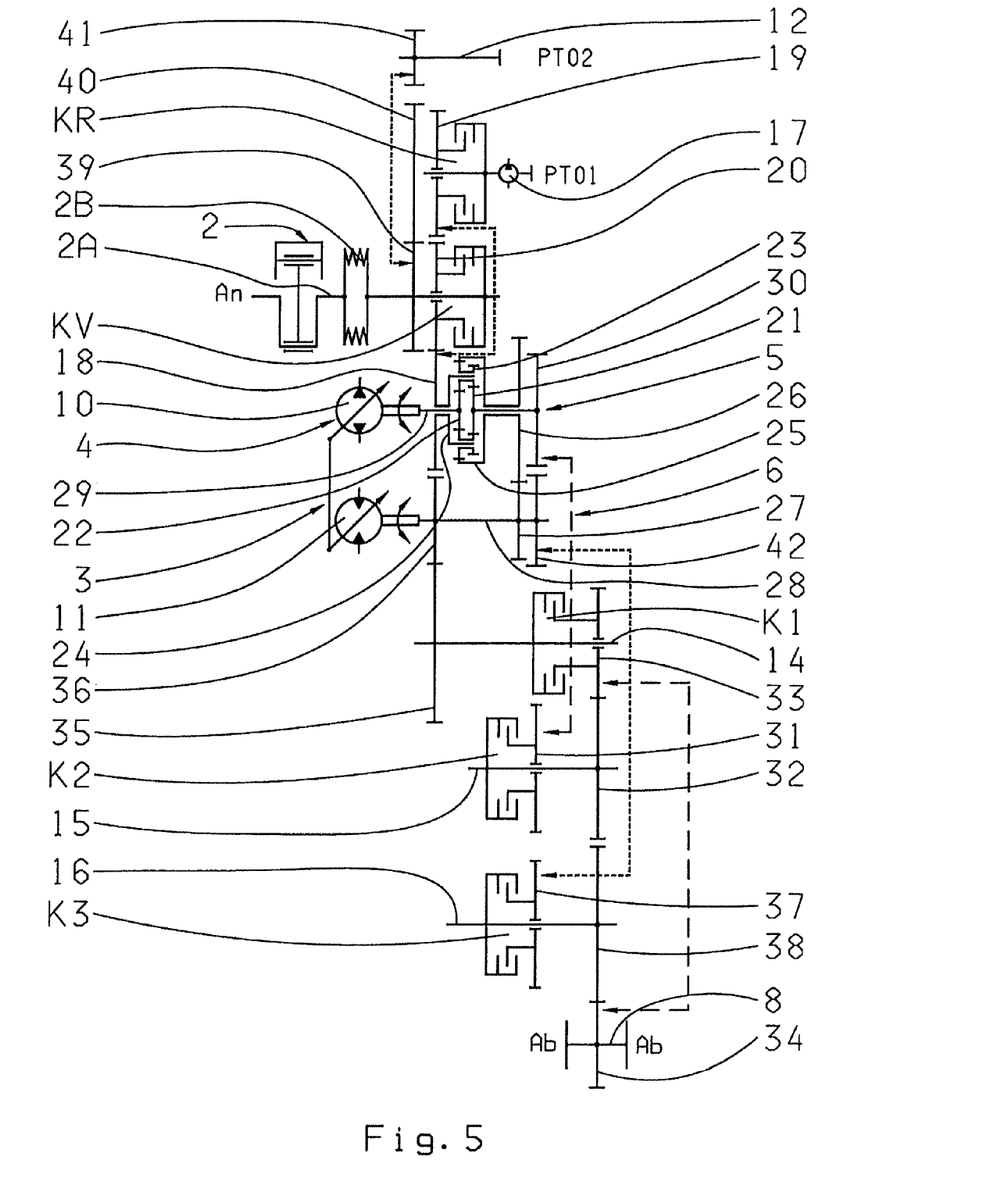
FIG. 5: A representation corresponding to FIG. 1, showing a fifth embodiment of the transmission device according to the invention.

The fifth example embodiment of the transmission device 1 shown in FIG. 5 differs from the fourth embodiment in FIG. 4 only in the area of the design of the first shifting element K1 and the form of the gearwheels 33 and 35, in such manner that both the first shifting element K1 and also the gearwheels 33 and 35 correspond to the embodiment shown in FIG. 3.

Figure 6:
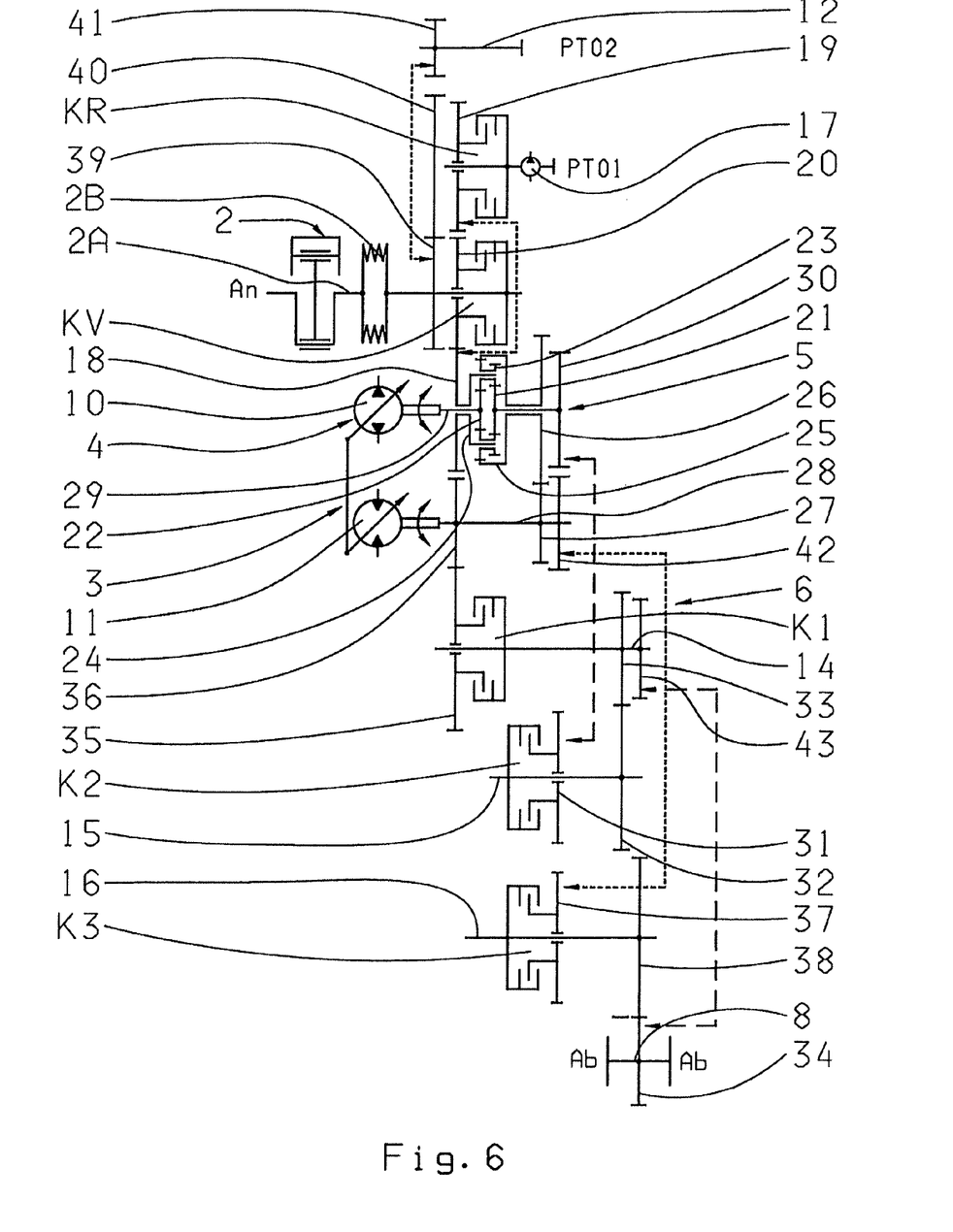
FIG. 6: A sixth embodiment of the transmission device according to the invention, represented as in FIG. 1.

For its part, the sixth example embodiment shown in FIG. 6 differs from the fourth embodiment of the transmission device 1 shown in FIG. 4, only in having a further gearwheel 43 made as a fixed wheel in the area associated with the first shifting element K1, by virtue of which the countershaft 14 mates with the fixed wheel 34 of the transmission output shaft 8.

By virtue of the additional gearwheel 43 in the area of the countershaft 14 associated with the first shifting element K1, certain transmission ratio variations can be obtained depending on whether the transmission device 1 is designed as a two-range or a three-range transmission and the respectively necessary drive power requirements can be covered. Regardless of the design of the transmission device 1 as a two-range or three-range transmission, all other gearwheel pairings can be made identically.

When the first driving range is engaged, the power flow takes place starting from the gearwheel 36, to the gearwheel 35, to the gearwheel 43 and from there to the fixed wheel 34 of the transmission output shaft 8. If the second driving range is engaged in the transmission device 1 the force flow passes, starting from the fixed wheel 30, to the gearwheel 31 in this case made as a loose wheel, the fixed wheel 32 and the fixed wheel 33 which meshes with it, and the further gearwheel 43 of the countershaft, to the fixed wheel 34 of the transmission output shaft 8 that in turn meshes therewith, and on to the drive output.

When the third driving range is engaged, the power flows from the fixed wheel 42 of the first hydrostatic shaft 28 to the loose wheel 37 of the third shifting element K3 that meshes with it and the fixed wheel 38 of the countershaft 16, and thence to the fixed wheel 34 of the transmission output shaft 8 which meshes with it.

In a simple manner, the arrangement of the chain of fixed wheels, consisting of the fixed wheels 39 to 41 on the motor side, makes it possible to accommodate the second power take-off that can be coupled with the countershaft 12 in the fitting space existing in the vehicle. Particularly when the transmission device 1 is arranged in a wheel loader vehicle frame, collisions with other vehicle components are minimized, which is a considerable advantage.

Various power demands on the transmission device 1 can be met with the transmission device according to the invention regardless of whether it is designed as a two-range or three-range transmission, in each case in a simple manner by varying the gearwheel pairings that comprise the gearwheels 26 and 31 or the gearwheels 32, 33 and 34. For example, with appropriate design of these gearwheel pairings the further gearwheel 43 in the transmission device 1 shown in FIG. 6 can be avoided.

Regardless of the design of the transmission device 1 as a two-range or three-range transmission, the transmission ratio in the area of the gearwheel pairing between the gearwheels 36 and 35 can in each case be made identically in order to keep the rotational speed differences between the shifting element halves of the first shifting element K1 in its disengaged operating condition as small as possible while operating in the second driving range or in the third driving range.

In this case the transmission capability of the first shifting element K1 is made as large as possible in order to be able to provide as large as possible a transmission ratio of the gearwheel pairing between the gearwheels 36 and 35 and to keep the reverse rotational speeds in the area of the first shifting element K1 as low as possible while operating in the second and third driving range.

Basically, depending on the application concerned the gearwheels 35, 33, 31, 32, 37 and 38 provided in the area of the shifting elements K1 to K3 can be made as loose or fixed wheels. Moreover, the gearwheels 37 and 38 of the countershaft 16 arranged in the area of the third shifting element K3 and the gearwheels 35 and 33 of the countershaft 14 arranged in the area of the first shifting element K1 can be brought into fixed engagement with the gearwheel 26 or with a gearwheel that meshes or is coupled with it, i.e. in the present case the gearwheel 27 or the gearwheel 36.

Indexes

1 Transmission device
2 Drive machine
2A Engine output shaft
2B Oscillation damper
3 First power branch
4 Hydrostatic device
5 Second power branch
6 Mechanical device
7 Transmission input shaft
8 Transmission output shaft
9 Gear system
10 First hydraulic unit
11 Second hydraulic unit
12 to 16 Countershaft
17 Transmission pump
18 Gearwheel
19 Loose wheel
20 Loose wheel
21 First sun gear
22 Second sun gear
23 Double planetary gearwheels
24 Planetary carrier
25 Ring gear
26 Fixed wheel
27 Further fixed wheel
28 First hydrostatic shaft
29 Second hydrostatic shaft
30 Fixed wheel
31 Loose wheel
32 Fixed wheel
33 Fixed wheel
34 Fixed wheel
35 Loose wheel
36 Fixed wheel
37 Loose wheel
38 Loose wheel
39 Fixed wheel
40 Fixed wheel
41 Fixed wheel
42 Fixed wheel
43 Gearwheel
K1 to K3 Shifting element
KR, KV Drive direction shifting element

The invention claimed is:

1. A transmission device (1) with power branching, the transmission device (1) comprising:
a first power branch (3) and a second power branch (5), with a transmission arrangement (9) in a form of a planetary gear system for summing parts of applied torque that are transmittable by way of the first and the second power branches (3, 5),
a hydrostatic device (4) having a first hydraulic unit (10) and a second hydraulic unit (11), the first hydraulic unit (10) being connected to a second hydrostatic shaft (29) and the second hydraulic unit (11) being connected to a first hydrostatic shaft (28) such that, in each case, first, second and third driving ranges, for forward and reverse driving, are provided which can be shifted, respectively, between by at least one shifting element (K1 to K3) that has to be disengaged and at least one shifting element (K1 to K3) that has to be engaged, and each of the shifting elements (K1 to K3) being arranged on a separate countershaft (14, 15 16),
the planetary gear system comprising a first and a second sun gear (21, 22) which engage with common double planetary gearwheels (23), a ring gear (25) and a planetary carrier (24) such that the second sun gear (22) being connected to the second hydrostatic shaft (29) and the ring gear (25) being connected, by way of a fixed wheel (26) and a further fixed wheel (27), to the first hydrostatic shaft (28), in the first and the third driving ranges, the power of the first and the second power branches (3, 5) being summed by the first hydrostatic shaft (28) connected to the second hydraulic unit (11) and the further fixed wheel and an other fixed wheel (27, 36) being arranged on the first hydrostatic shaft (28) such that a shifting element half of a first shifting element (K1), by which the first driving range is obtained in the engaged operating condition of the first shifting element (K1), being functionally connected by way of a gearwheel (33; 43) of the countershaft (14) to a transmission output shaft (8) and another shifting element half, of the first shifting element (K1), being functionally connected by way of a further gearwheel (35) of the countershaft (14) to the first hydrostatic shaft (28) connected to the hydrostatic device (4), and such that either an inner disk carrier or an outer disk carrier of the first shifting element (K1) being connected to the countershaft (14) and either the outer disk carrier or the inner disk carrier being connected to a gearwheel (35 or 33) which is coupled by the first shifting element (K1) to the associated countershaft (14), and such that the gearwheel (35 or 33) that is connectable, in a rotationally fixed manner, by the first shifting element (K1) to the associated countershaft (14) being functionally connected to the transmission output shaft (8) and the fixed wheel (33 or 35 or 43) of the countershaft (14) meshing with a fixed wheel (36) of the first hydrostatic shaft (28) associated with the hydrostatic device (4).

2. The transmission device according to claim 1, wherein for the power branching and for summing the parts of the applied torque, which can be transmitted by the power branches, the transmission arrangement (9) in the form of a planetary gear system is provided, which comprises two sun gears (21, 22) that engage with common double planetary gearwheels (23) which, in turn, mesh with the ring gear (25).

3. The transmission device according to claim 1, wherein the gearwheel (35 or 33) which is connectable, in a rotationally fixed manner, by the first shifting element (K1) to the associated countershaft (14) meshes with a fixed wheel (36) of the first hydrostatic shaft (28) associated with the hydrostatic device (4), and a fixed wheel (33 or 35 or 43) of the countershaft (14) is functionally connected to the transmission output shaft (8).

4. The transmission device according to claim 1, wherein a loose wheel (31) which is connectable in a rotationally fixed manner to the associated countershaft (15) by a second shifting element (K2), by which the second driving range can be obtained when the second shifting element (K2) is in an engaged operating condition, meshes with a fixed wheel (30) connected in a rotationally fixed manner to the first sun gear (21) of the transmission arrangement (9), and a fixed wheel (32) of the countershaft (15) is functionally connected to one of the gearwheels (33) of the countershaft (14) associated with the first shifting element (K1).

5. The transmission device according to claim 1, wherein a further shifting element (K3), arranged on an additional countershaft (16), is provided for obtaining the third driving range.

6. The transmission device according to claim 1, wherein a loose wheel (37) that is connectable in a rotationally fixed manner to the associated countershaft (16) by the third shifting element (K3), by which the third driving range can be obtained when the third shifting element (K3) is in an engaged operating condition, meshes with a further fixed wheel (27; 42) of the first hydrostatic shaft (28) associated with the hydrostatic device (4), and a fixed wheel (38) of the countershaft (16) is functionally connected to the transmission output shaft (18).

7. The transmission device according to claim 1, wherein a fixed wheel (39) of a transmission input shaft (7) can be connected, via a fixed wheel (40) of a further countershaft (13), to a hydraulic pump of a first working hydraulic system, and, via a fixed wheel (41) of an additional countershaft (12), to a hydraulic pump of a second working hydraulic system.

8. The transmission device according to claim 7, wherein the transmission input shaft (7) can be brought into functional connection with a planetary carrier (24) of the planetary gear system (9) by driving direction shifting elements (KR, KV).

9. The transmission device according to claim 8, wherein the fixed wheels (39, 40, 41) are arranged between the driving direction shifting elements (KR, KV) and the transmission input shaft (7).

10. The transmission device according to claim 9, wherein the driving direction shifting elements (KR, KV) are arranged between the fixed wheels (39, 40, 41) and the transmission input shaft (7).

11. A transmission device (1) with power branching, the transmission device comprising:

first and second power branches (3, 5) and a planetary gear system (9) for summing applied torques that are transmitted by the first and the second power branches (3, 5);

a hydrostatic device (4) having first and second hydraulic units (10, 11), the first hydraulic unit (10) coupling a first hydrostatic shaft (29) and the second hydraulic unit (11) coupling a second hydrostatic shaft (28) such that, in each of the first and the second power branches (3, 5), first, second and third driving ranges, in forward and reverse drive, can be implemented and shifted between by disengagement of at least one of a plurality of shifting element (K1, K2, K3) and engagement of at least one of the plurality of shifting element (K1, K2, K3), and each of the plurality of shifting elements (K1, K2, K3) being supported on a respective one of first, second and third counter shaft (14, 15 16);

the planetary gear system (9) comprises first and second sun gears (21, 22) engaging with common double planetary gear wheels (23), a ring gear (25) and a planetary carrier (24), the second sun gear (22) being fixedly coupled to the first hydrostatic shaft (29) and the ring gear (25) being directly connected to a first fixed wheel (26) which engages a second fixed wheel (27) that is fixedly coupled to the second hydrostatic shaft (28);

in the first and the third driving ranges, the applied torques of the first and the second power branches (3, 5) being summed by the second hydrostatic shaft (28) connected to the second hydraulic unit (11);

the second fixed wheel (27) and a third fixed wheels (36) being fixedly coupled to the second hydrostatic shaft (28) such that one half of a first of the plurality of shifting elements (K1) being functionally connected, via a gear wheel (33; 43) of the first counter shaft (14), to a transmission output shaft (8), by which the first driving range is implemented in an engaged operating condition of the first shifting element (K1), and another half of the first shifting element (K1) being functionally connected, via another gear wheel (35) of the first counter shaft (14), to the second hydrostatic shaft (28) connected to the hydrostatic device (4);

one of either an inner or an outer disk carrier of the first shifting element (K1) being connected to the first counter shaft (14) and the other of the outer or the inner disk carrier of the first shifting element (K1) being connected to the gear wheel (35 or 33) which is couplable, via the first shifting element (K1), to the first counter shaft (14) such that the gear wheel (35 or 33) that is couplable, via the first shifting element (K1), to the first counter shaft (14) being functionally connected to the transmission output shaft (8), and the gear wheel (33 or 35 or 43) of the first counter shaft (14) meshing with a fixed wheel (36) of the second hydrostatic shaft (28) that is associated with the hydrostatic device (4).

* * * * *